US012721338B2

(12) United States Patent
Knock et al.

(10) Patent No.: US 12,721,338 B2
(45) **Date of Patent: *Sep. 1, 2026**

(54) SURFACTANT COMPOSITIONS

(71) Applicant: Stepan Company, Northbrook, IL (US)

(72) Inventors: Mona Marie Knock, Barrington, IL (US); Gregory P. Dado, Chicago, IL (US)

(73) Assignee: STEPAN COMPANY, Northbrook, IL (US)

( * ) Notice: Subject to any disclaimer, the term of this patent is extended or adjusted under 35 U.S.C. 154(b) by 313 days.

This patent is subject to a terminal disclaimer.

(21) Appl. No.: 18/563,480

(22) PCT Filed: Aug. 4, 2022

(86) PCT No.: PCT/US2022/039369

§ 371 (c)(1),
(2) Date: Nov. 22, 2023

(87) PCT Pub. No.: WO2023/014851

PCT Pub. Date: Feb. 9, 2023

(65) Prior Publication Data

US 2024/0224992 A1 Jul. 11, 2024

Related U.S. Application Data

(60) Provisional application No. 63/229,913, filed on Aug. 5, 2021.

(51) Int. Cl.
*A01N 25/30* (2006.01)

(52) U.S. Cl.
CPC .................................... *A01N 25/30* (2013.01)

(58) Field of Classification Search
CPC ...................................................... A01N 25/30
See application file for complete search history.

(56) References Cited

U.S. PATENT DOCUMENTS

| | | | | |
|---|---|---|---|---|
| 4,780,237 | A * | 10/1988 | Schmid | C11D 1/8255 516/134 |
| 5,705,476 | A | 1/1998 | Hoffarth | |
| 7,560,494 | B2 * | 7/2009 | Steinbrenner | C11D 1/722 568/616 |
| 9,303,240 | B2 | 4/2016 | Man | |
| 2005/0170966 | A1 * | 8/2005 | Scovell | A01N 25/30 562/557 |
| 2013/0160676 | A1 | 6/2013 | Oestreich et al. | |
| 2019/0099720 | A1 | 4/2019 | Schacht | |
| 2020/0178523 | A1 * | 6/2020 | Buchek | A01N 57/20 |

FOREIGN PATENT DOCUMENTS

| | | | |
|---|---|---|---|
| CL | 2019001164 | A1 | 4/2019 |
| CL | 201902308 | A1 | 8/2019 |
| EP | 0019484 | A1 | 11/1980 |
| EP | 0681865 | A2 | 11/1995 |
| EP | 1050576 | A1 | 11/2000 |
| EP | 1956065 | | 8/2008 |
| GB | 2322552 | A | 2/1998 |
| JP | 63-035697 | A | 2/1988 |
| JP | 07-308561 | A2 | 11/1995 |
| JP | 2007-535400 | A | 12/2007 |
| WO | 9103536 | | 3/1991 |
| WO | 9114760 | | 10/1991 |
| WO | 200500368 | | 2/2005 |
| WO | 2005105285 | | 11/2005 |
| WO | 2013044442 | | 4/2013 |
| WO | 2015/161095 | A1 | 10/2015 |
| WO | 2020/018356 | A1 | 1/2020 |
| WO | 2023/014851 | A1 | 2/2023 |

OTHER PUBLICATIONS

Anonymous: Sunspray Spray Oils HollyFrontier Specialty Products, XP093271056, Aug. 9, 2022.
International Search Report and Written Opinion received for PCT Patent Application No. PCT/US2025/014402, mailed on May 15, 2025, 18 pages.
International Search Report issued in PCT/US2022/039369, mailed on Nov. 24, 2022.
P. Phaodee, et al; "Cold Water Detergency of Triacylglycerol Semisolid Soils: The Effect of Salinity, Alcohol Type, and Surfactant Systems"; J Surfact Deterg (2019) 22: pp. 1175-1187.
Office Action received for AU Patent Application No. 2024200726, mailed on Mar. 17, 2026, 4 pages.
Office Action received for Chinese Patent Application No. 202280038713.X, mailed on Feb. 13, 2026, 31 pages (14 pages of English Translation and 17 pages of Original Document).
Office Action received for Japanese Patent Application No. 2023-574259, mailed on Apr. 7, 2026, 7 pages (3 pages of English Translation and 4 pages of Original Document).

* cited by examiner

*Primary Examiner* — Sahana S Kaup
*Assistant Examiner* — Toriana N. Vigil
(74) *Attorney, Agent, or Firm* — DILWORTH IP, LLC

(57) ABSTRACT

Compositions comprising a nonionic surfactant and 0.1 to 30 wt. % of a low-mole alkoxylate are disclosed. Some low-mole alkoxylates have the formula $$R-O-(AO)_pH$$

wherein R is a linear or branched $C_8$-$C_{16}$ alkyl or alkanolamide group, AO is oxypropylene (PO), oxyethylene (EO), or combinations thereof in random or block configuration, p has an average value within the range of 0.5 to 7, the average number of PO groups is within the range of 0.5 to 4, and the average number of EO groups is within the range of 0 to 3. Dilute aqueous solutions comprising a nonionic surfactant and a minor proportion of a low-mole alkoxylate wet hydrophobic surfaces more effectively, limit foaming, and degrease better than solutions comprising only the nonionic surfactant. The low-mole alkoxylates help to boost wetting performance in applications that require low-foaming surfactants, such as automatic dishwashing and laundry detergents.

32 Claims, 2 Drawing Sheets

SURFACTANT COMPOSITIONS

FIELD OF THE INVENTION

The invention relates to nonionic surfactant compositions having improved wetting of hydrophobic surfaces, ease of formulation, suitability for low-foam applications, and enhanced degreasing.

BACKGROUND OF THE INVENTION

Nonionic surfactants are used in cleaners, personal cleansers, oilfield chemicals, agricultural formulations, industrial degreasing, paints and coatings, laundry detergents, and many other applications. Most nonionic surfactants have a combination of polar and nonpolar segments that allow them to function effectively as surfactants. Many common nonionic surfactants are less effective than desirable as wetting agents and degreasers for oily soils, and some, e.g., higher mole alcohol ethoxylates, wet hydrophobic surfaces only with difficulty.

So-called "extended" nonionic surfactants are known in which the hydrophobic portion, usually an alkyl group, is directly bonded to one or more oxypropylene (PO) units, followed by a cap of four or more oxyethylene (EO) units. See, for example, U.S. Pat. No. 9,303,240 or U.S. Publ. No. 2019/0099720. The surfactants are suggested as an environmentally friendly alternative to nonylphenol ethoxylates.

Combinations of ethoxylated alcohol surfactants with a minor proportion of free fatty alcohols can in some cases improve a nonionic surfactant's ability to wet a hydrophobic surface. For instance, P. Phaodee et al. (*J. Surfact. Deterg.* 22 (2019) 1175) showed that including a linear (non-alkoxylated) $C_6$-$C_9$ alcohol as an additive with a $C_{10}$-$C_{16}$ alcohol 7EO ethoxylate reduced the contact angle on solid coconut oil from about 48 degrees to 33-44 degrees (see Table 2). Despite the apparent improvement in wettability shown in the article, the presence of free fatty alcohol can have undesirable consequences. These drawbacks may include one or more of: (1) reduced water solubility, thereby straining the overall solubilization load on the formulation and potentially resulting in separation or undesired deposition of oily droplets on surfaces to be wetted; (2) a measurable disturbance of the interfacial tension (IFT) or cloud point of the formulation; (3) disruption of micellar aggregation of the surfactant; and (4) contact angles that vary considerably depending on chain length of the free fatty alcohol.

The industry would benefit from nonionic surfactant compositions with enhanced versatility, especially an improved ability of dilute aqueous surfactant solutions to wet nonpolar surfaces. Improved compositions would work more effectively as wetting agents while avoiding excessive foaming. Compositions based on commercially available nonionic surfactants such as fatty alcohol ethoxylates or low foaming alcohol alkoxylates would be preferred. Desirably, these products could be formulated while avoiding the undesirable side effects of including a free fatty alcohol. Ideally, the products would deliver physical property advantages such as substantial and consistent reductions in contact angle and critical micelle concentration without adversely impacting low-foam properties, cloud point, micellar aggregation, or solubility.

SUMMARY OF THE INVENTION

In one aspect, the invention relates to a composition comprising a nonionic surfactant and a low-mole alkoxylate. The composition comprises 70 to 99.9 wt. % of the nonionic surfactant and 0.1 to 30 wt. % of the low-mole alkoxylate. The low-mole alkoxylate has the formula:

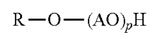

In the formula, R is a linear or branched $C_8$-$C_{16}$ alkyl group, AO is oxypropylene (PO), oxyethylene (EO), or combinations thereof in random or block configuration, p has an average value within the range of 0.5 to 7, the average number of PO groups is within the range of 0.5 to 4, and the average value of EO groups is within the range of 0 to 3.

In a particular aspect, the invention relates to compositions comprising 92 to 98 wt. % of a $C_8$-$C_{16}$ fatty alcohol ethoxylate as the nonionic surfactant and 2 to 8 wt. % of a low-mole alkoxylate of the formula:

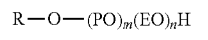

wherein R is a linear or branched $C_8$-$C_{16}$ alkyl group, PO is oxypropylene, EO is oxyethylene, m has an average value within the range of 0.5 to 4, and n has an average value within the range of 0 to 1.

In another aspect, the invention relates to a composition comprising a nonionic surfactant and a low-mole alkoxylate. The composition comprises 70 to 99.9 wt. % of the nonionic surfactant and 0.1 to 30 wt. % of the low-mole alkoxylate. The low-mole alkoxylate has the formula:

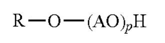

In the formula, R is a linear or branched $C_8$-$C_{16}$ alkyl or alkanolamide group, AO is oxypropylene (PO), oxyethylene (EO), or combinations thereof in random or block configuration, p has an average value within the range of 0.5 to 7, the average number of PO groups is within the range of 0.5 to 4, and the average value of EO groups is within the range of 0 to 3.

In still another aspect, the invention relates to a composition comprising:

(a) 92 to 98 wt. % of a $C_8$-$C_{16}$ fatty alcohol ethoxylate surfactant; and (b) 2 to 8 wt. % of a low-mole alkoxylate of the formula:

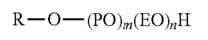

wherein R is a linear or branched $C_8$-$C_{16}$ alkyl or alkanolamide group, PO is oxypropylene, EO is oxyethylene, m has an average value within the range of 0.5 to 4, and n has an average value within the range of 0 to 1.

In another aspect, the invention relates to a method comprising forming a mixture by combining a nonionic surfactant with 0.1 to 30 wt. % of a low-mole alkoxylate of the formula:

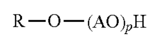

wherein R is a linear or branched $C_8$-$C_{16}$ alkyl or alkanolamide group, AO is oxypropylene (PO), oxyethylene (EO), or combinations thereof in random or block configuration, p has an average value within the range of 0.5 to 7, the average number of PO groups is within the range of 0.5 to 4, and the average number of EO groups is within the range of 0 to 3;

wherein the low-mole alkoxylate is included in an amount effective to improve at least one of: (a) the ability of the mixture to wet a hydrophobic surface; (b) the degreasing ability of the mixture; (c) the ability of the mixture to resist excessive foaming; and (d) the ease of solubilizing the nonionic surfactant to give a stable formulation.

In a particular aspect, the invention relates to compositions comprising 92 to 98 wt. % of a $C_8$-$C_{16}$ fatty alcohol ethoxylate as the nonionic surfactant and 2 to 8 wt. % of a low-mole alkoxylate of the formula:

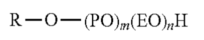

wherein R is a linear or branched $C_8$-$C_{16}$ alkyl group, PO is oxypropylene, EO is oxyethylene, m has an average value within the range of 0.5 to 4, and n has an average value within the range of 0 to 1.

In other aspects, the invention relates to a method. The method comprises forming a mixture by combining a nonionic surfactant with 0.1 to 30 wt. % of a low-mole alkoxylate of the formula

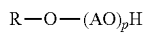

wherein R is a linear or branched $C_8$-$C_{16}$ alkyl group, AO is oxypropylene (PO), oxyethylene (EO), or combinations thereof in random or block configuration, p has an average value within the range of 0.5 to 7, the average number of PO groups is within the range of 0.5 to 4, and the average value of EO groups is within the range of 0 to 3. In this method, the low-mole alkoxylate is included in an amount effective to improve at least one of: (a) the ability of the mixture to wet a hydrophobic surface; (b) the degreasing ability of the mixture; (c) the ability of the mixture to resist excessive foaming; and (d) the ease of solubilizing the nonionic surfactant to give a stable formulation.

We found that dilute aqueous solutions comprising a nonionic surfactant and a minor proportion (e.g., 5 wt. %) of a low-mole alkoxylate wet hydrophobic surfaces more effectively and degrease better than solutions comprising only the nonionic surfactant. The low-mole alkoxylates are low- to no-foam surfactants that can help to boost wetting performance in applications that require low-foaming surfactants, such as automatic dishwashing and laundry detergents. The low-mole alkoxylates expand the utility of a wide range of commercial nonionic surfactants, particularly ones that normally wet hydrophobic surfaces only with difficulty.

DETAILED DESCRIPTION OF THE INVENTION

Compositions

Figure 1:
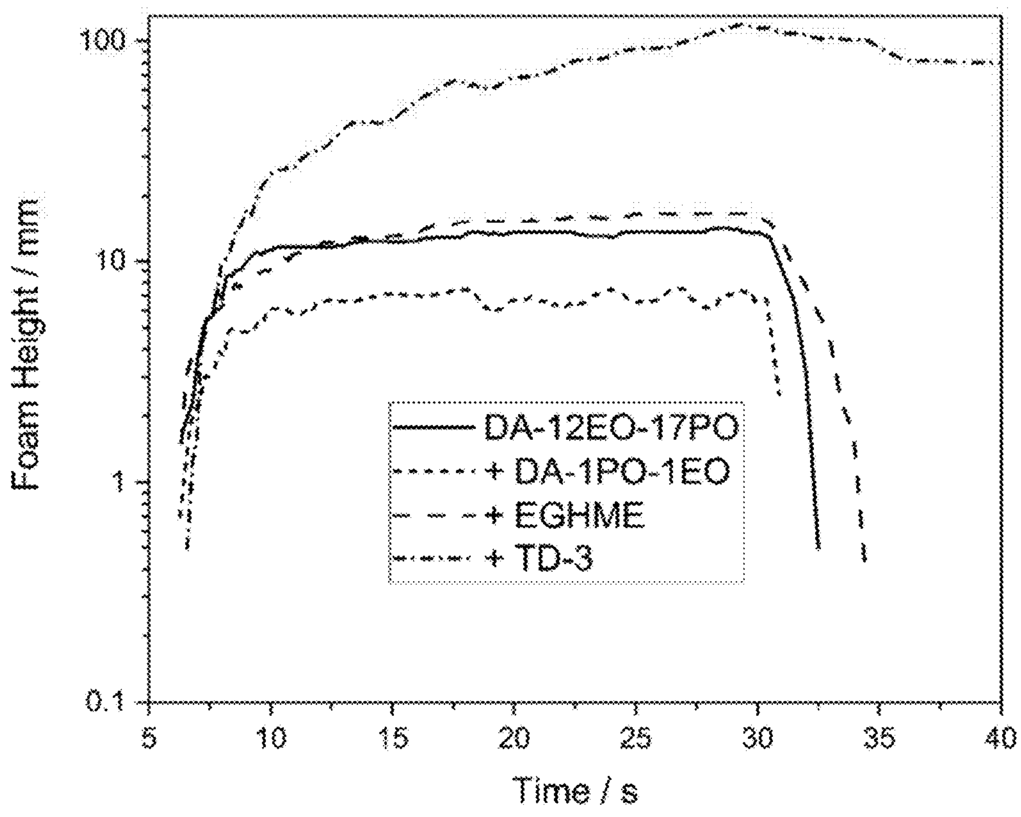
FIG. 1 is a foam profile demonstrating the advantage of combining 0.1 wt. % of DA-1PO-1EO versus other additives with a low-foam surfactant (DA-12EO-17PO).

In some aspects, the invention relates to compositions comprising a nonionic surfactant and a low-mole alkoxylate.

1. Nonionic Surfactant

The compositions comprise 70 to 99.9 wt. % of a nonionic surfactant. In some aspects, the compositions comprise 85 to 99 wt. %, or 90 to 98 wt. %, of the nonionic surfactant. The weight percentages are based on the amount of composition, which includes the nonionic surfactant, the low-mole alkoxylate, and any other components.

Suitable nonionic surfactants are well known. In some aspects, the nonionic surfactant is selected from alkoxylated alcohols, fatty alcohol ethoxylates, ethoxylated alkanolamides, ethoxylated alkylphenols, ethoxylated styrylphenols, fatty amine ethoxylates, EO/PO block copolymers, ethoxylated castor oils, methyl ester ethoxylates, alkylpolyglucosides, polysorbates, and fatty acid ethoxylates. Modified versions of these classes of nonionic surfactants can also be used. Thus, one or more terminal hydroxyl groups of the nonionic surfactants can be converted or capped as halide, ether, ester, or other suitable functionalities according to well-known methods.

In a preferred aspect, the nonionic surfactant is an alkoxylated alcohol. The alkoxylated alcohol preferably has a $C_8$-$C_{16}$ alkyl chain and one or more oxyethylene (EO) groups, oxypropylene (PO) groups, or combinations of these. The oxyalkylene units can be arranged in block, multiblock, or random configuration.

In some aspects, the alkoxylated alcohol has the formula:

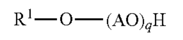

In the formula, $R^1$ is a linear or branched $C_8$-$C_{16}$ alkyl group, AO is oxyethylene, oxypropylene, or a combination thereof, and q has an average value within the range of 3 to 50. In some preferred aspects, AO is oxyethylene and q has an average value within the range of 5 to 20. In other preferred aspects, AO is oxyethylene, $R^1$ is a linear or branched $C_9$-$C_{13}$ alkyl group, and q has an average value within the range of 5 to 20. Suitable for use are nonionic surfactants that comprise broad or narrow ranges of product distributions that result from the catalyst selection and/or reactant proportions used in the manufacturing of the nonionic surfactants, as is well known to those skilled in the art.

Suitable nonionic surfactants are commercially available from Stepan Company and other suppliers. Suitable Stepan nonionic surfactants include those, for example, sold under the MAKON®, BIO-SOFT®, NINOL®, STEPANTEX®, PETROSTEP®, POLYSTEP®, STEP-FLOW®, NINEX®, TOXIMUL®, and IGEPAL® marks, especially the ethoxylated alcohols and other products sold under the BIO-SOFT® and MAKON® marks. Examples include BIO-SOFT® N1-5, BIO-SOFT® N91-6, BIO-SOFT® N91-8, BIO-SOFT® N25-7, MAKON® DA-9, MAKON® TD-9, MAKON® TD-12, MAKON® TD-18, MAKON® NF-180, STEPASOL® DG, MAKON® UD-8, and the like.

2. Low-Mole Alkoxylate

The inventive compositions include a low-mole alkoxylate. The low-mole alkoxylate differs in composition from the nonionic surfactant and is present in an additive proportion when compared with the amount of nonionic surfactant.

The low-mole alkoxylate has the formula:

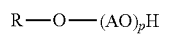

wherein R is a linear or branched $C_8$-$C_{16}$ alkyl group, AO is oxypropylene (PO), oxyethylene (EO), or combinations thereof in random or block configuration, p has an average value within the range of 0.5 to 7, the average number of PO groups is within the range of 0.5 to 4, and the average number of EO groups is within the range of 0 to 3.

In some aspects, preferably, R is branched. In some aspects, the low-mole alkoxylate has an average of 0.6 to 2, or 0.8 to 1.2, or about 1 PO units per molecule and an average of 0 to 1, or 0 to 0.5, or 0 to 0.1 EO units per molecule. In some aspects, R is a linear or branched $C_9$-$C_{14}$ alkyl group or a linear or branched $C_{10}$-$C_{13}$ alkyl group.

The compositions comprise 0.1 to 30 wt. % of the low-mole alkoxylate based on the amount of composition. In some aspects, the compositions comprise 0.5 to 15 wt. % or 1 to 8 wt. % of the low-mole alkoxylate.

In some aspects, the low-mole alkoxylate has the formula:

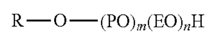

wherein R is a linear or branched $C_8$-$C_{16}$ alkyl group, PO is oxypropylene, EO is oxyethylene, m has an average value within the range of 0.5 to 4, and n has an average value within the range of 0 to 1. In other aspects, m has an average value within the range of 0.6 to 2, 0.8 to 1.2, or about 1, and n has an average value within the range of 0 to 0.5, or within the range of 0 to 0.1.

In some aspects, the low-mole alkoxylate has the formula:

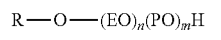

wherein R is a linear or branched $C_8$-$C_{16}$ alkyl group, EO is oxyethylene, PO is oxypropylene, n has an average value within the range of 0 to 1, and m has an average value within the range of 0.5 to 4. In other aspects, n has an average value within the range of 0 to 0.5, or within the range of 0 to 0.1, and m has an average value within the range of 0.6 to 2, 0.8 to 1.2, or about 1. In some aspects, the low-mole alkoxylate has only oxypropylene (and no oxyethylene) units. Thus, in some aspects, the low-mole alkoxylate has the formula:

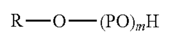

wherein R is a linear or branched $C_8$-$C_{16}$ alkyl group, PO is oxypropylene, and m has an average value within the range of 0.5 to 4, 0.6 to 2, 0.8 to 1.5, or 0.9 to 1.2. In other aspects, m is preferably about 1. In a preferred aspect, R is a branched $C_{10}$-$C_{13}$ alkyl group.

In a preferred aspect, the low-mole alkoxylate has an average of about 1 PO unit per molecule and an average of 0 to 1, 0 to 0.5, or 0 to 0.1 EO units per molecule.

3. Clear Isotropic Fluids

In some aspects, the inventive compositions are combined with enough water to impart physical stability and form a clear, isotropic mixture. Thus, in some aspects, the inventive compositions comprise 0.1 to 20 wt. %, or 1 to 15 wt. %, of water based on the amount of inventive composition.

Method

An inventive method comprises forming a mixture by combining a nonionic surfactant with 0.1 to 30 wt. %, 0.5 to 15 wt. %, or 1 to 8 wt. % of a low-mole alkoxylate. The low-mole alkoxylate has the formula:

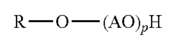

wherein R is a linear or branched $C_8$-$C_{16}$ alkyl group, AO is oxypropylene (PO), oxyethylene (EO), or combinations thereof in random or block configuration, p has an average value within the range of 0.5 to 7, the average number of PO groups is within the range of 0.5 to 4, and the average number of EO groups is within the range of 0 to 3. The low-mole alkoxylate is included in an amount effective to improve at least one of: (a) the ability of the mixture to wet a hydrophobic surface; (b) the degreasing ability of the mixture; (c) the ability of the mixture to resist excessive foaming; and (d) the ease of solubilizing the nonionic surfactant to give a stable formulation.

In other inventive methods, the low-mole alkoxylate has any of the compositions previously described above and has at least one of the performance attributes (a)-(d) of the preceding paragraph.

Aqueous Solutions

In some aspects, the invention includes an aqueous solution comprising water and 0.005 to 50.0 wt. %, 0.05 to 5.0 wt. %, or 0.1 to 5.0 wt. % of the compositions described above.

Other Components

In some aspects, the inventive compositions include other components in addition to the nonionic surfactant and the low-mole alkoxylate. The nature and proportion of these components will depend on the particular end-use application. The compositions might include, for instance, other surfactants, solvents, pH adjusting agents, antifoams, polymers, enzymes, builders, dispersants, dyes, fragrances, oils, active ingredients, or the like, and combinations thereof.

Applications

The inventive compositions and aqueous solutions containing them are useful in many end-use applications. In some instances, the compositions and aqueous solutions of the invention may improve speed to the interface. End-use applications include, for example, hard-surface cleaners, biocidal cleaners, antimicrobial active potentiation or delivery, nonwoven processing aids, nonwoven wipe cleaners and disinfectants, inks, antispotting aids, metalworking fluids, degreasing formulations, lubricants, automatic dish detergents, rinse aids, laundry detergents and pretreaters, defoamers, anti-foamers, adhesive removers, and glass, plastic, and paper recycling. In addition, the invention aids no-rinse applications such as nonwoven wipes cleaners and disinfectants, floor care and floor cleaners, daily shower cleaners, automotive and fleet washes, exterior cleaners for buildings, decks, patios, and windows. The inventive compositions and aqueous solutions are also valuable for formulating agricultural adjuvants (e.g., activator and tank-mix adjuvants), agricultural compositions that include one or more pesticides, flowback aids for use in oilfield applications, mineral and pigment dewatering, pre-coating metal rust inhibitors, various paints, inks, or coatings, and creams, lotions, or other personal care or parenteral formulations. The inventive composition can be present in the above applications either by combining the components directly in a blend, or by adding the components separately, where the individual components are part of other compositions.

The following examples merely illustrate the inventive subject matter. Many similar variations within the scope of the claims will immediately be apparent to those skilled in the art.

Effect on Contact Angle of Blending Low-Mole Alkoxylates with BIO-SOFT® N91-8

Aqueous solutions of BIO-SOFT® N91-8 (a $C_9$-$C_{11}$ alcohol 8EO ethoxylate, 0.1 wt. %) are prepared. The additives listed in Table 1 are introduced at 0.005 wt. % (i.e., 5 wt. % based on the amount of surfactant used). Contact angles on polyethylene film (PARAFILM® M, product of Bemis) of the dilute aqueous solutions are measured at quasi-equilibrium, approximately 10-30 seconds after deposition of a 5-μL drop, using a Krüss DSA100 drop shape analysis instrument. The average value from measurement of 10 drops is recorded in Table 1. Critical micelle concentration (CMC) is also determined by exponential dilution of a 0.1 wt % surfactant solution by ultrapure water using the Wilhelmy Plate method on a Krüss K100 tensiometer, and values are reported in the table.

TABLE 1

Contact Angles: Blends of 5% Additive with BIO-SOFT ® N91-8 (linear $C_9$-$C_{11}$ alcohol 8EO ethoxylate)

| Ex. | Additive[1] | Contact angle[2] | Std. dev. | Δ contact angle | CMC[3], mg/L | Δ CMC |
|---|---|---|---|---|---|---|
| control | none | 48.4 | 0.88 | 0 | 285 | 0 |
| 1 | DA-1PO | 38.2 | 0.47 | −10 | 264 | −21 |
| 2 | DA-2PO | 40.7 | 0.73 | −7.7 | 229 | −55 |
| 3 | DA-3PO | 40.8 | 0.56 | −7.6 | 244 | −41 |
| 4 | DA-5PO | 43.1 | 0.56 | −5.3 | 237 | −48 |
| 5 | DA-1PO-1EO | 41.0 | 0.64 | −7.4 | 282 | −2.2 |
| 6 | DA-2PO-1EO | 42.3 | 0.93 | −6.1 | 257 | −27 |
| 7 | DA-3PO-1EO | 43.7 | 0.49 | −4.7 | 260 | −25 |
| 8 | DA-5PO-1EO | 44.5 | 0.73 | −3.9 | 232 | −52 |
| 9 | EXXAL ® 9-2PO | 42.7 | 0.67 | −5.7 | 287 | 2.0 |
| C10 | EXXAL ® 9-2EO | 47.2 | 0.79 | −1.1 | 300 | 15 |
| C11 | EG monohexyl ether | 48.2 | 0.83 | −0.2 | 290 | 5.9 |
| 12 | n-$C_{12}$-$C_{14}$-1PO[4] | 41.4 | 0.99 | −7.0 | 85.2 | −199 |

[1]DA = EXXAL ® 10 (isodecyl alcohol), product of ExxonMobil. EXXAL ® 9 (isononyl alcohol) is a product of ExxonMobil.
[2]Average of 10 measurements.
[3]Critical micelle concentration.
[4]Linear alcohol comprising about 65-75 wt. % of $C_{12}$ and 20-30 wt. % of $C_{14}$ components reacted with 1 molar equivalent of propylene oxide.

As shown in Table 1, addition of 5 wt. % of a low-mole alkoxylate of isodecyl alcohol with 1-5 PO units and 0 or 1 EO unit (Examples 1-8) to BIO-SOFT® N91-8 reduces the contact angle and critical micelle concentration (CMC) compared with the values observed for BIO-SOFT® N91-8 alone. The low-mole alkoxylates with 1 mole of PO and 1 mole of EO are somewhat less effective in reducing contact angle compared with their PO-only analogs. The results also demonstrate that multiple PO units are less effective than a single PO unit in reducing contact angle (compare Example 1 with Examples 2-4, or compare Example 5 with Examples 6-8).

A reduction in contact angle versus the control is also observed when the low-mole alkoxylate is an adduct of EXXAL® 9 (isononyl alcohol) and 2 PO units. Interestingly, little or no reduction of contact angle or CMC is observed when the alkoxylate is an adduct of 2 EO units and EXXAL® 9 (Comparative Example 10). Blending BIO-SOFT® N91-8 with 5 wt. % of ethylene glycol monohexyl ether (Comparative Example 11) fails to improve wetting of the polyethylene film.

Effect on Contact Angle of Low-Mole Alkoxylates: Branched Alcohol Ethoxylates

Contact angles of a series of branched alcohol ethoxylates are compared with contact angles of blends of the same branched alcohol ethoxylates with 3 or 6 wt. % of a low-mole alkoxylate (DA-1PO or DA-1PO-1EO). Results appear in Table 2.

Compared with linear alcohol ethoxylates, branched alcohol ethoxylates tend to be better at wetting hydrophobic surfaces; consequently, the reductions in contact angle shown in Table 2 are relatively subtle. However, contact angles measured for dilute aqueous solutions containing combinations of a low-mole alkoxylate with the more highly ethoxylated products (e.g., MAKON® TD-12 and MAKON® TD-18) demonstrate substantial reductions, even at 3 wt. % additive. Generally, DA-1PO is more effective than DA-1PO-1EO in reducing contact angle.

TABLE 2

Contact Angles: Blends of Additives (3 or 6 wt. %) with Branched Alcohol Ethoxylates

| | | | 3 wt. % Additive | | 6 wt. % Additive | |
|---|---|---|---|---|---|---|
| Ex. | Branched alcohol ethoxylate[1] | Additive | Contact angle[2] | Std. dev. | Contact angle[2] | Std. dev. |
| | MAKON ® | none (control) | 34.7 | 0.96 | 34.7 | 0.96 |
| 12 | TD-6 | DA-1PO | 28.4 | 0.86 | 33.3 | 0.95 |
| 13 | | DA-1PO-1EO | 35.0 | 0.43 | 34.2 | 0.55 |
| | MAKON ® | none (control) | 39.0 | 0.19 | 39.0 | 0.19 |
| 14 | TD-9 | DA-1PO | 38.6 | 0.61 | 38.0 | 0.74 |
| 15 | | DA-1PO-1EO | 38.8 | 1.0 | 39.6 | 0.46 |
| | MAKON ® | none (control) | 54.6 | 0.60 | 54.6 | 0.60 |
| 16 | TD-12 | DA-1PO | 50.9 | 0.32 | 48.4 | 0.62 |
| 17 | | DA-1PO-1EO | 52.1 | 0.83 | 50.6 | 0.75 |
| | MAKON ® | none (control) | 63.8 | 0.34 | 63.8 | 0.34 |
| 18 | TD-18 | DA-1PO | 54.1 | 0.86 | 55.3 | 0.78 |
| 19 | | DA-1PO-1EO | 59.6 | 0.16 | 54.6 | 0.90 |
| | MAKON ® | none (control) | 35.4 | 0.78 | 35.4 | 0.78 |
| 20 | UD-6 | DA-1PO | 36.2 | 0.61 | 32.4 | 0.96 |
| 21 | | DA-1PO-1EO | 34.4 | 0.99 | 33.9 | 0.54 |
| | MAKON ® | none (control) | 40.8 | 0.63 | 40.8 | 0.63 |
| 22 | UD-8 | DA-1PO | 38.5 | 0.30 | 35.5 | 0.89 |
| 23 | | DA-1PO-1EO | 37.6 | 0.74 | 37.2 | 1.0 |
| | MAKON ® | none (control) | 37.1 | 1.3 | 37.1 | 1.3 |
| 24 | DA-6 | DA-1PO | 33.9 | 1.1 | 33.5 | 1.5 |
| 25 | | DA-1PO-1EO | 34.4 | 1.3 | 33.2 | 1.9 |

[1]Products of Stepan Company
[2]Average of 10 measurements.

Advancing/Receding Contact Angles on Blends of Additive and Rinse-Aid Surfactant Advancing and receding contact angles are determined using the Wilhelmy Method and a Krüss K100 tensiometer. Contact angles are the average of three fitted experiments of slowly dipping a polypropylene film (Goodfellow Cambridge Ltd.) into the solution and retracting it from that solution. Results appear in Table 3.

TABLE 3

Advancing and Receding Contact Angles: Blends of 5 wt. % Additive with Rinse-Aid Surfactant DA-12EO-17PO (branched $C_{10}$ alcohol 12EO 17PO alkoxylate) Wetting of Polypropylene Film

| Ex. | Additive[1,4,5,6,7,8,9,10] | Advancing contact angle, PP[2] | Std. dev. | Δ contact angle | Receding contact angle, PP[3] | Std. dev. | Δ contact angle |
|---|---|---|---|---|---|---|---|
| control | none | 60.6 | 2.3 | 0 | 20.2 | 2.5 | 0 |
| 1 | DA-1PO-1EO | 57.0 | 0.9 | −3.6 | 13.2 | 0.3 | −7.0 |
| 2 | DA-1EO-1PO | 57.7 | 1.2 | −1.7 | 12.2 | 1.8 | −8.0 |
| 3 | DA-1EO | 61.8 | 2.8 | 1.2 | 14.3 | 0.3 | −5.9 |
| 4 | DA-1PO | 58.4 | 1.4 | −2.2 | 1.5 | 2.5 | −18.7 |
| C5 | 2-propylheptanol | 63.7 | 2.1 | 4.3 | 18.9 | 1.8 | −1.3 |
| 6 | DA-1PO-2EO | 60.0 | 1.9 | −0.6 | 19.3 | 0.1 | −0.9 |
| 7 | DA-1PO-3EO | 57.3 | 1.3 | −3.3 | 21.6 | 0.1 | 1.4 |
| 8 | DA-3EO-1PO | 62.4 | 1.6 | 1.8 | 20.9 | 2.3 | 0.7 |
| 9 | Alfol 10-1PO-1EO | 58.9 | 0.4 | 1.7 | 9.1 | 0.2 | −11.1 |
| 10 | Alfol 10-1PO | 58.8 | 1.7 | −1.8 | 11.0 | 1.4 | −9.2 |
| 11 | 2PH-3PO-3EO | 52.7 | 0.4 | −7.9 | 2.4 | 2.1 | −17.8 |
| 12 | 2PH-3PO-1EO | 57.2 | 2.7 | −3.4 | 13.5 | 0.5 | −6.7 |
| 13 | 2PH-2PO-1EO | 60.0 | 0.7 | −0.6 | 13.9 | 0.3 | −6.3 |
| 14 | 2PH-1PO-1EO | 59.6 | 1.0 | −1.0 | 15.2 | 0.3 | −5 |
| 15 | 2PH-2PO | 56.8 | 2.4 | −3.8 | 14.0 | 0.7 | −6.2 |
| 16 | 2PH-1PO | 63.0 | 2.7 | 2.4 | 14.8 | 1.0 | −5.4 |
| 17 | TD-1PO-3EO | 52.3 | 2.6 | −8.3 | 2.4 | 2.1 | −17.8 |
| 18 | TD-1PO-1EO | 58.8 | 3.2 | −1.8 | 4.1 | 2.5 | −16.1 |
| 19 | TD-1PO | 60.3 | 2.7 | −0.3 | 11.0 | 0.4 | −9.2 |
| 20 | N91-1PO-1EO | 60.3 | 3.0 | −0.3 | 6.8 | 3.8 | −13.4 |
| 21 | 2EH-1PO-1EO | 63.6 | 3.6 | 3.0 | 19.0 | 1.0 | −1.2 |
| 22 | 2EH-1PO | 61.0 | 1.1 | 0.4 | 16.5 | 0.5 | −3.7 |
| 23 | UD-1PO-1EO | 58.0 | 1.2 | −2.4 | 9.4 | 0.1 | −10.8 |
| 24 | UD-1PO | 62.6 | 3.6 | 2.0 | 12.4 | 1.0 | −7.8 |
| 25 | Ninol M10-1PO-1EO | 58.4 | 2.0 | −2.2 | 3.0 | 2.5 | −17.2 |
| 26 | Ninol M10-1PO | 61.3 | 1.4 | 0.7 | 15.6 | 1.2 | −4.6 |

[1]DA = EXXAL ® 10 (isodecyl alcohol), product of ExxonMobil.

[2,3]Average of at least three measurement cycles on polypropylene film.

[4]Alfol 10 is 1-decanol, product of Sasol.

[5]2PH is 2-propylheptanol, product of Perstorp.

[6]TD = EXXAL ® 13 (tridecyl alcohol), product of ExxonMobil.

[7]N91 is NEODOL ® 91 (C9-11 alcohol), product of Shell.

[8]2-EH = 2-ethyl-1-hexanol (isooctyl alcohol), product of SigmaAldrich.

[9]UD = EXXAL ® 11 (isoundecyl alcohol), product of ExxonMobil.

[10]Ninol ® M10 (cocoamide monoisopropylamine), product of Stepan.

As shown in Table 3, receding contact angle results amplify differences (versus advancing contact angle measurements) and demonstrate the improved wetting ability of low-mole alkoxylates when compared with a branched $C_{10}$ alcohol (Comparative Example 5). The examples illustrate the value of including 5 wt. % of a low-mole alkoxylate, especially one having a single PO unit (Example 4), for enhancing the wetting ability of the rinse-aid surfactant. The reduction observed in the receding contact angle is particularly relevant to applications where sheeting behavior is desirable, such as in rinse-aids. Further, examples 6-8 demonstrate a general negative influence of increasing EO content in the alkoxylate on wetting enhancement, specific to DA. Moreover, examples 11-16 display an opposite trend in the effect of EO on wetting enhancement, specific to 2PH. Together, these examples demonstrate that wetting enhancement enabled by a low mole alkoxylate is dependent on both the amount of PO and EO, as well as the hydrophobe.

Degreasing Experiments

Surfactant solutions containing 0.2 wt. % of a nonionic surfactant (see Table 4) and 0.01 wt. % of DA-1PO-1EO additive are prepared.

CRISCO® shortening (between 0.1000 g and 0.1100 g) is applied as a thin, even layer to 2/3 to 3/4 of one face of a pre-weighed stainless-steel coupon (nearest 0.1 mg). When the desired amount of shortening has been applied, the mass of the coated coupon (to the nearest 0.1 mg is recorded) is determined.

Surfactant solution is added to five beakers, each equipped with a magnetic stir bar, and the solutions are stirred at 1400 rpm at room temperature using a digital stirplate. Coated coupons are immersed in the solutions with the coated side facing the direction of liquid flow. After 30 min. of immersion, the coupons are removed, gently rinsed with deionized water, and allowed to dry in the hood. After drying, the coupons are reweighed to determine the amount of soil removed. Ten replicates are performed for each sample, and the results are averaged. Results appear in Table 4.

TABLE 4

CRISCO ® Immersion Degreasing of Nonionic Surfactants (0.2 wt. %) with DA-1PO-1EO Additive (0.01 wt. %)

| Ex. | Nonionic surfactant[1] | Additive[2] | wt. % soil removed | Std. dev. | Δ wt. % |
|---|---|---|---|---|---|
| A | MAKON ® UD-8 ($C_{11}$ branched | DA-1-PO-1EO | 33 | 9.2 | 28 |
| control A | alcohol 8EO ethoxylate) | none | 5 | 1.2 | — |
| B | MAKON ® TD-12 ($C_{13}$ branched | DA-1-PO-1EO | 7 | 1.8 | 6 |
| control B | alcohol 12EO ethoxylate) | none | 1 | 0.7 | — |
| C | | DA-1-PO-1EO | 15 | 4.0 | 16 |
| control C | MAKON ® DA-9 ($C_{10}$ branched alcohol 9EO ethoxylate) | none | −1 | 0.6 | — |
| D | BIO-SOFT ® N91-8 ($C_9$-$C_{11}$ linear | DA-1-PO-1EO | 10 | 3.2 | 6 |
| control D | alcohol 8EO ethoxylate) | none | 4 | 3.8 | — |
| E | BIO-SOFT ® N91-6 ($C_9$-$C_{11}$ linear | DA-1-PO-1EO | 9 | 6.3 | 3 |
| control E | alcohol 6EO ethoxylate) | none | 6 | 2.5 | — |
| F | BIO-SOFT ® N1-9 ($C_9$-$C_{11}$ linear | DA-1-PO-1EO | 9 | 2.0 | 2 |
| control F | alcohol 9EO ethoxylate) | none | 7 | 1.2 | — |
| G | BIO-SOFT ® N1-5 ($C_{11}$ linear | DA-1-PO-1EO | 36 | 8.9 | 9 |
| control G | alcohol 9EO ethoxylate) | none | 27 | 5.4 | — |

[1]Products of Stepan Company.
[2]DA = EXXAL ® 10 (isodecyl alcohol), product of ExxonMobil As shown in Table 4, the degreasing ability of dilute aqueous solutions containing various alcohol ethoxylate surfactants can be improved when the surfactants are combined with 5 wt. % of a low-mole alkoxylate (EXXAL® 10 adduct with 1 PO unit and 1 EO unit). The change in soil removal performance is mild (Examples E and F) or substantial (Examples A-D and G) depending upon which nonionic surfactant is used.

Defoaming Experiments

The foamability of a low-foam surfactant, DA-12EO-17PO, is tested through sparging for 25 s at 25° C. A 50-mL solution of 0.1 wt. % total actives (0.094 wt. % DA-12EO-17PO+0.006 wt. % additive) is sparged with air at 0.5 L/m within a Krüss DFA100 instrument. The profile of transient foam generation obtained during active sparging is recorded and analyzed. The foam profile as a function of time is shown in FIG. 1. Maximum foam heights (mm) are compared in Table 5.

TABLE 5

Maximum Foam Height (mm) of DA-12EO-17PO Low-Foam Surfactant (0.094 wt. %) with DA-1PO-1EO Additive (0.006 wt. %)

| Ex. | Nonionic surfactant[1] | Additive[2] | Maximum Foam Height, mm | Δ, mm |
|---|---|---|---|---|
| 1 | DA-12EO-17PO | none | 13.9 | — |
| 2 | DA-12EO-17PO | DA-1PO-1EO | 7.3 | −6.6 |
| C3 | DA-12EO-17PO | EG monohexyl ether | 16.6 | 2.7 |
| C4 | DA-12EO-17PO | 2-propylheptanol | 9.1 | −4.8 |
| C5 | DA-12EO-17PO | EXXAL ® 10 | 10.1 | −3.8 |
| C6 | DA-12EO-17PO | MAKON ® TD-3 | 119 | 105 |

[1,2]DA = EXXAL ® 10 (isodecyl alcohol). EXXAL ® 10 and EXXAL ® 11 (isoundecyl alcohol) are products of ExxonMobil. MAKON ® TD-3 is a product of Stepan Company.

Figure 2:
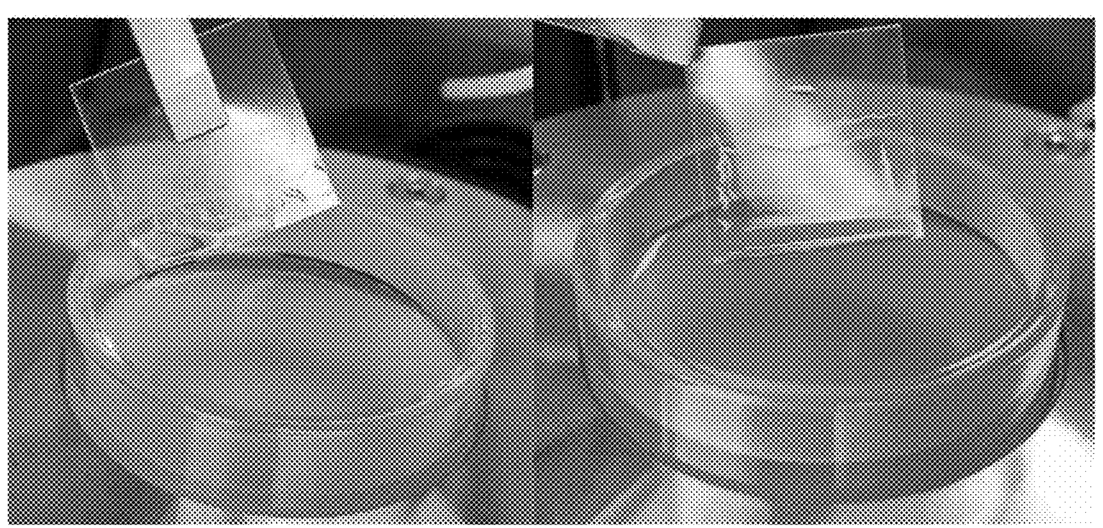
FIG. 2 shows photographs from two different solutions of 0.094% DA-12EO-17PO with 0.006% EXXAL 10 (left image) or with 0.006% DA-1PO-1EO (right image). The left image is of oily droplets of Exxal 10 deposited on the surface of a dewetted PVC plastic coverslip (Fisher Sci. Unbreakable Cover Slips 12-547) dipped into the solution. The right image shows photographs of a solution of 0.0094% DA-12EO-17PO with 0.006% DA-1PO-1EO. This solution completely wets the plastic coverslip, showing sheeting behavior and no phase separation.

As shown in Table 5 and FIG. 1, the low-mole ethoxylate (MAKON® TD-3, Comparative Example 7) as an additive generates a much larger accumulation of foam under sparging conditions, and when the sparging is discontinued, the foam does not immediately collapse. In contrast, when PO is included in the low-mole alkoxylate (DA-1PO-1EO, Example 2), the maximum foam height is minimized, and the foam collapses immediately upon removal of active sparging. Further, the left image in FIG. 2 shows that use of EXXAL 10 fatty alcohol (no PO and no EO) as an additive results in undesirable oily deposits on surfaces and interfaces, whereas the right image shows that such deposits are not observed with DA-1PO-1EO, which demonstrates no-residue sheeting.

The preceding examples are meant only as illustrations; the following claims define the scope of the invention.

We claim:

1. A composition comprising:

(a) 70 to 99.9 wt. % of a nonionic surfactant; and (b) 0.1 to 30 wt. % of a low-mole alkoxylate of the formula:

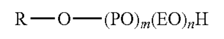

$$R—O—(PO)_m(EO)_nH$$

wherein R is a linear or branched $C_8$-$C_{16}$ alkyl group PO is oxypropylene, EO is oxyethylene, m has an average value within the range of 0.5 to 4, and n has an average value within the range of 0 to 1.

2. The composition of claim 1 comprising 85 to 99 wt. % of the nonionic surfactant.

3. The composition of claim 1 wherein the nonionic surfactant is selected from the group consisting of alkoxylated alcohols, fatty alcohol ethoxylates, ethoxylated alkanolamides, ethoxylated alkylphenols, ethoxylated styrylphenols, fatty amine ethoxylates, EO/PO block copolymers, ethoxylated castor oils, methyl ester ethoxylates, alkylpolyglucosides, polysorbates, fatty acid ethoxylates, and modified versions thereof in which one or more terminal hydroxyl groups is capped as an ether, ester, or halide.

4. The composition of claim 1 wherein the nonionic surfactant is an alkoxylated alcohol.

5. The composition of claim 4 wherein the alkoxylated alcohol has the formula:

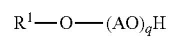

$$R^1—O—(AO)_qH$$

wherein $R^1$ is a linear or branched $C_8$-$C_{16}$ alkyl group, AO is oxyethylene, oxypropylene, or combinations thereof in random or block configuration, and q has an average value within the range of 3 to 50.

6. The composition of claim 5 wherein AO in the alkoxylated alcohol is oxyethylene and q has an average value within the range of 5 to 20.

7. The composition of claim 1 comprising 1 to 8 wt. % of the low-mole alkoxylate.

8. The composition of claim 1 wherein m has an average value within the range of 0.8 to 1.5 and n has an average value within the range of 0 to 0.5.

9. The composition of claim 1 wherein R is a branched $C_{10}$-$C_{13}$ alkyl group.

10. A clear, isotropic composition comprising the composition of claim 1 and 0.1 to 20 wt. % water based on the amount of isotropic composition.

11. An aqueous solution comprising water and 0.005 to 50.0 wt. % of the composition of claim 1.

12. An agricultural adjuvant or a pesticide-containing composition comprising the composition of claim 1.

13. A composition comprising:

(a) 92 to 98 wt. % of a $C_8$-$C_{16}$ fatty alcohol ethoxylate surfactant; and (b) 2 to 8 wt. % of a low-mole alkoxylate of the formula:

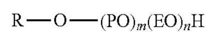

wherein R is a linear or branched $C_8$-$C_{16}$ alkyl group, PO is oxypropylene, EO is oxyethylene, m has an average value within the range of 0.5 to 4, and n has an average value within the range of 0 to 1.

14. The composition of claim 13 wherein m has an average value within the range of 0.8 to 1.2, and n has an average value within the range of 0 to 0.5.

15. The composition of claim 13 wherein R is branched, m is about 1, and n has an average value within the range of 0 to 0.1.

16. A method comprising forming a composition by combining a nonionic surfactant with 0.1 to 30 wt. % of a low-mole alkoxylate of the formula:

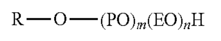

wherein R is a linear or branched $C_8$-$C_{16}$ alkyl group PO is oxypropylene, EO is oxyethylene, m has an average value within the range of 0.5 to 4, and n has an average value within the range of 0 to 1;

wherein the composition comprises from 70 to 99.9 wt. % of the nonionic surfactant; and wherein the low-mole alkoxylate is included in an amount effective to improve at least one of: (a) the ability of the composition to wet a hydrophobic surface; (b) the degreasing ability of the composition; (c) the ability of the composition to resist excessive foaming; and (d) the ease of solubilizing the nonionic surfactant to give a stable composition.

17. A composition comprising:

(a) 70 to 99.9 wt. % of a nonionic surfactant; and (b) 0.1 to 30 wt. % of a low-mole alkoxylate of the formula:

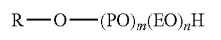

wherein R is a linear or branched $C_8$-$C_{16}$ alkyl or alkanolamide group PO is oxypropylene, EO is oxyethylene, m has an average value within the range of 0.5 to 4, and n has an average value within the range of 0 to 1.

18. The composition of claim 17 comprising 85 to 99 wt. % of the nonionic surfactant.

19. The composition of claim 17 wherein the nonionic surfactant is selected from the group consisting of alkoxylated alcohols, fatty alcohol ethoxylates, ethoxylated alkanolamides, ethoxylated alkylphenols, ethoxylated styrylphenols, fatty amine ethoxylates, EO/PO block copolymers, ethoxylated castor oils, methyl ester ethoxylates, alkylpolyglucosides, polysorbates, fatty acid ethoxylates, and modified versions thereof in which one or more terminal hydroxyl groups is capped as an ether, ester, or halide.

20. The composition of claim 17 wherein the nonionic surfactant is an alkoxylated alcohol.

21. The composition of claim 20 wherein the alkoxylated alcohol has the formula:

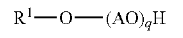

wherein $R^1$ is a linear or branched $C_8$-$C_{16}$ alkyl or alkanolamide group, AO is oxyethylene, oxypropylene, or combinations thereof in random or block configuration, and q has an average value within the range of 3 to 50.

22. The composition of claim 21 wherein AO in the alkoxylated alcohol is oxyethylene and q has an average value within the range of 5 to 20.

23. The composition of claim 17 comprising 1 to 8 wt. % of the low-mole alkoxylate.

24. The composition of claim 17 wherein m has an average value within the range of 0.8 to 1.5 and n has an average value within the range of 0 to 0.5.

25. The composition of claim 17 wherein R is a branched $C_{10}$-$C_{13}$ alkyl or alkanolamide group.

26. A clear, isotropic composition comprising the composition of claim 17 and 0.1 to 20 wt. % water based on the amount of isotropic composition.

27. An aqueous solution comprising water and 0.005 to 50.0 wt. % of the composition of claim 17.

28. An agricultural adjuvant or a pesticide-containing composition comprising the composition of claim 17.

29. A composition comprising:

(a) 92 to 98 wt. % of a $C_8$-$C_{16}$ fatty alcohol ethoxylate surfactant; and (b) 2 to 8 wt. % of a low-mole alkoxylate of the formula:

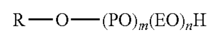

wherein R is a linear or branched $C_8$-$C_{16}$ alkyl or alkanolamide group, PO is oxypropylene, EO is oxyethylene, m has an average value within the range of 0.5 to 4, and n has an average value within the range of 0 to 1.

30. The composition of claim 29 wherein m has an average value within the range of 0.8 to 1.2, and n has an average value within the range of 0 to 0.5.

31. The composition of claim 29 wherein R is branched, m is about 1, and n has an average value within the range of 0 to 0.1.

32. A method comprising forming a composition by combining a nonionic surfactant with 0.1 to 30 wt. % of a low-mole alkoxylate of the formula:

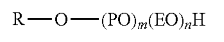

wherein R is a linear or branched $C_8$-$C_{16}$ alkyl or alkanolamide group PO is oxypropylene, EO is oxyethylene, m has an average value within the range of 0.5 to 4, and n has an average value within the range of 0 to 1;

wherein the composition comprises from 70 to 99.9 wt. % of the nonionic surfactant; and wherein the low-mole alkoxylate is included in an amount effective to improve at least one of: (a) the ability of the composition to wet a hydrophobic surface; (b) the degreasing ability of the composition; (c) the ability of the composition to resist excessive foaming; and (d) the ease of solubilizing the nonionic surfactant to give a stable composition.

* * * * *